United States Patent [19]

Jacobson et al.

[11] Patent Number: 4,787,252

[45] Date of Patent: Nov. 29, 1988

[54] DIFFERENTIAL CORRELATION ANALYZER

[75] Inventors: Saul A. Jacobson, Bellingham; Lawrence C. Lynnworth, Waltham; James M. Korba, Woburn, all of Mass.

[73] Assignee: Panametrics, Inc., Waltham, Mass.

[21] Appl. No.: 103,066

[22] Filed: Sep. 30, 1987

[51] Int. Cl.$^4$ ................................................. G01F 1/66
[52] U.S. Cl. .................................................. 73/861.28
[58] Field of Search ......... 73/861.28, 861.29, 861.31, 73/861.27, 597; 364/510, 569; 374/119

[56] References Cited

U.S. PATENT DOCUMENTS 4,630,482 12/1986 Traina ........................ 73/861.28 X

FOREIGN PATENT DOCUMENTS 124028 9/1981 Japan ................................. 374/119

Primary Examiner—Jerry W. Myracle
Attorney, Agent, or Firm—Lahive & Cockfield

[57] ABSTRACT

A flow meter, or flow path intervalometer, transmits a transmission signal modulated with digital pseudo-noise or similar code. The received signal is correlated with the transmitted signal at successive times to produce a correlation function having a peak at a time to equal to the propagation time. The code is selected such that the side lobes of the correlation function are small. An interpolator determines a precise time of maximum correlation. In one embodiment, upstream and downstream correlation functions are defined and are correlated to determine an upstream-downstream propagation time difference interval $\Delta t$. In a preferred embodiment the digital code is a Barker code, and the transmitted signal is a finite interval wave which is phase modulated by the Barker code. In another embodiment, the received signal is a reflected signal which is range gated so as to represent flow data originating from a desired region within the conduit. The signal is sampled in phase quadrature and transformed to determine its frequency domain representation, and the devide derives local flow rate information from Doppler information. In yet another embodiment, a plurality of transducers are arranged to provide a number of sampling paths across the conduit, and the flow meter varies the range gating interval for the signal received along each path to derive a Doppler frequency, hence flow rate, for each of many sample intevals or bins along the path. The total flow in the conduit is then obtained by summing the flow in each bin times a cross-sectional area weighting factor.

18 Claims, 9 Drawing Sheets (a₁)

(a₂)

(b₁)

(b₂)  $C(R_2-R_1, R_4-R_3)$ (c₁)

STEP
$0 < \Delta_i t < 1/2$ PERIOD
SELECT BEST $C_i$ (c₂)

* COR TAG $R_1, R_2$ FROM SINGLE
* TRANSIT TIME CORRELATION
* DOPPLER
* PASSIVE NOISE SENSING ($d_1$) ($d_2$)

RANGE GATE·
* COR. TAG
* DOPPLER ($e_1$) ($e_2$)

* MEASURE V WITH $T_1$
* MEASURE H WITH $T_2$
* COMPUTE Q ($f_1$) ($f_2$)

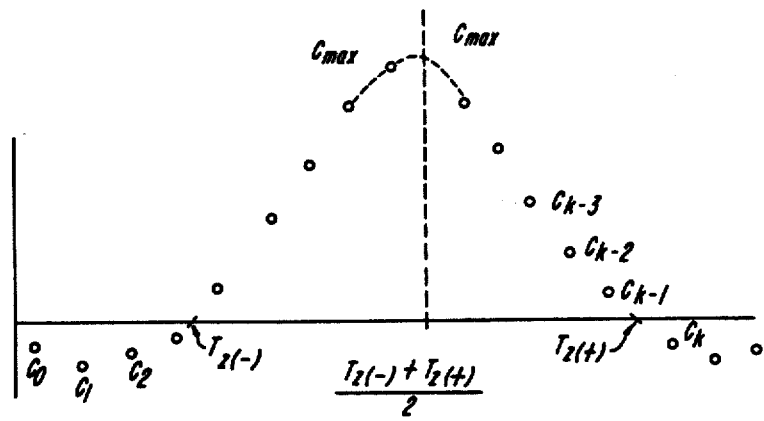
FIG. 9A
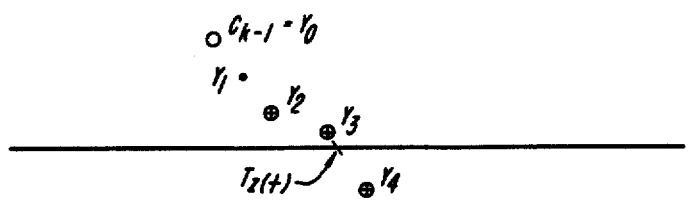
FIG. 9B
| 125 | -14 | 7 | -5 | 4 | -3 | 3 | -2 |
| 115 | -23 | 13 | -9 | 7 | -5 | 5 | -4 |
| 100 | -27 | 16 | -11 | 9 | -7 | 6 | -5 |
| 81 | -27 | 16 | -12 | 9 | -7 | 6 | -5 |
| 60 | -23 | 14 | -10 | 8 | -7 | 6 | -5 |
| 38 | -16 | 10 | -8 | 6 | -5 | 4 | -4 |
| 18 | -8 | 5 | -4 | 3 | -3 | 2 | -2 |
FIG. 9C

DIFFERENTIAL CORRELATION ANALYZER

The present invention relates to flow meters, and particularly to ultrasonic flow meters wherein an ultrasonic wave is transmitted along a defined path through a medium, and is detected by a tranducer and analyzed in order to determine the flow rate of the medium. In particular it relates to such instruments for detecting the transit time of the wave along the path, or the difference in upstream and downstream transit times. It also relates to instruments for detecting a Doppler shift of the transmitted wave, and instruments for providing total flow measurements.

Generally the selection of appropriate instrumentation to monitor a given flow environment with a desired accuracy depends on a number of factors, including the purity, temperature, molecular weight and viscosity of the flowing material, the Physical geometry and composition of the conduit or container, and the temperature, approximate flow range, and flow profile.

As a rule, where the medium is clean, non-viscous and has laminar flow, the flow rate may be determined from the transit times of ultrasonic signals injected along a path having an upstream and/or downstream Path component, provided pipe dimensions permit a sufficiently long path. For smaller conduits and flow path lengths, a zig-zag Propagation path may be appropriate. Where the medium is viscous, or has bubbles or entrained matter which strongly degrade the transmitted signal, so that time-of-arrival information cannot be determined with accuracy, or bears a complex relation to flow rate, measurement of the Doppler shift of a transmitted wave can provide information on the velocity of the bubbles or other scatterers. These scatterers, if small, may be assumed to move at the flow velocity. Another approach, called correlation tag measurement, is applicable to flows of inhomogeneous liquids. It usually involves transmitting and receiving a continuous wave (CW) at two stations along a flow path. When a sharp anomaly occurs in the trace of the received signal at the first station, the time interval is measured until the same anomaly (or "tag") passes the second station. The second station must be sufficiently close so that re-mixing does not obscure the form of the sought-for trace.

A general survey of ultrasonic flow measurement systems is provided in Lawrence C. Lynnworth, *Ultrasonic Flowmeters*, in Transactions of the Institute of Measurement and Control, Vol. 3, No. 4 Oct.-Dec. 1981 pp. 217-223 and Vol. 4, No. 1 Jan.-Mar. 1982 pp. 2-24, to which the reader is referred for background information on the selection of measurement configurations and the equations governing determination of flow parameters.

Each of the prior art ultrasonic flow measurement devices depends on the accurate determination of a characteristic, such as frequency, or time-of-arrival, of a received wave form. To measure one of these characteristics accurately may require a Precisely controlled mounting of particular types of transducers in a particular conduit geometry. When the flow medium or its characteristics change, the accuracy of this determination may limit the applications of the device.

SUMMARY AND OBJECTS OF THE INVENTION

It is an object of the invention to provide an instrument which more accurately detects a characteristic of a received ultrasonic wave.

It is another object of the invention to Provide an instrument which modulates an ultrasonic wave with a code, transmits the coded wave into a medium, and detects a characteristic of the medium by analysis of a received wave.

It is another object of the invention to Provide an instrument wherein the received wave is correlated with the transmitted wave to determine the time of arrival of said received wave.

It is another object of the invention to provide an instrument wherein transmitted waves are correlated with corresponding received waves to produce correlation functions, and the correlation functions are correlated to provide a direct measure of $\Delta t$.

It is a further object of the invention to provide an instrument which selects different transmitting or analyzing protocols in accordance with the qualities of a received signal.

These and other features of the invention are obtained in a flow meter, or flow path intervalometer, in which a transmission signal is modulated with a pseudorandom signal or code. The code-modulated signal is transmitted along the medium path from a first transducer and is received at a second transducer. The received signal is correlated with the transmitted signal at successive times to produce a correlation function having a peak at a time to equal to the sound wave propagation time between the two transducers. The code is selected such that the side lobes of the correlation functions are small. Preferably identical contrapropagating waves are launched simultaneously or in an alternating sequence from the two transducers, and the corresponding received waves are each correlated, so as to produce a respective upstream and a downstream correlation function.

The two correlation functions corresponding to the upstream and downstream signals are then correlated over time to determine the contrapropagation difference interval $\Delta t$. In one preferred embodiment the digital code is a Barker code, and the transmitted signal is a finite interval wave (i.e., a tone burst) which is phase modulated by the Barker code.

In another embodiment, the received signal is a reflected signal which is detected by range gating so as to represent flow data originating from a desired region within the conduit. The signal is digitally processed in phase quadrature to determine its frequency, and the device derives local flow rate information from spectral information.

In another embodiment, a pair of identical coded transmission signals are launched and a corresponding pair of reflected signals, each of which has transversed a substantially identical path through the medium, are detected, sampled and stored. The two reflected signals are correlated to determine a time offset representative of the change in the length of the acoustic path to the flow-entrained scatterers in the medium.

In yet a further embodiment, a plurality of transducers are arranged to provide a number of disjoint sampling paths across the conduit, and the flow meter varies the range gating interval for the reflected signal received along each path. The received signals are processed to derive a characteristic representative of flow, such as Doppler frequency, for each of many sample intervals or bins along the path. The Doppler frequency is converted to a flow rate and the total flow in the conduit is obtained by summing the flow of each bin times a cross-sectional area weighting factor. In this manner flow is determined using signals characteristic of a scattered-signal interrogation, yet with an accuracy characteristic of the transit time techniques usually applicable only to transmitted signals in non-scattering flow conditions.

BRIEF DESCRIPTION OF DRAWINGS

These and other features of the invention will be understood from the description below of illustrative embodiments, in conjunction with the drawings, wherein:

FIGS. 9A–9D illustrate timing interpolation performed by the invention; and

DETAILED DESCRIPTION OF ILLUSTRATED EMBODIMENTS

Figure 1:
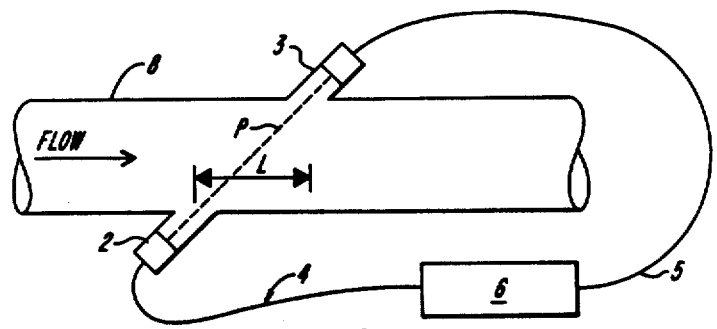
FIG. 1 shows elements of an illustrative flow determination system.

FIG. 1 shows a flow measurement system 1 according to the present invention for determining the flow rate of a medium flowing in a conduit 8. The system includes a flow meter 6 for determining and displaying, or otherwise indicating the flow rate. Meter 6 is connected via electrical leads 4, 5 to transducers 2, 3 which are mounted on opposing sides of conduit 8 and are positioned to define an interrogation path P of precisely defined geometric dimensions across the direction of flow. Path P has a component of length L in the direction of flow. Other arrangements of transducers and interrogation path configurations are possible, as discussed more fully in the aforesaid Lynnworth article.

Figure 2:
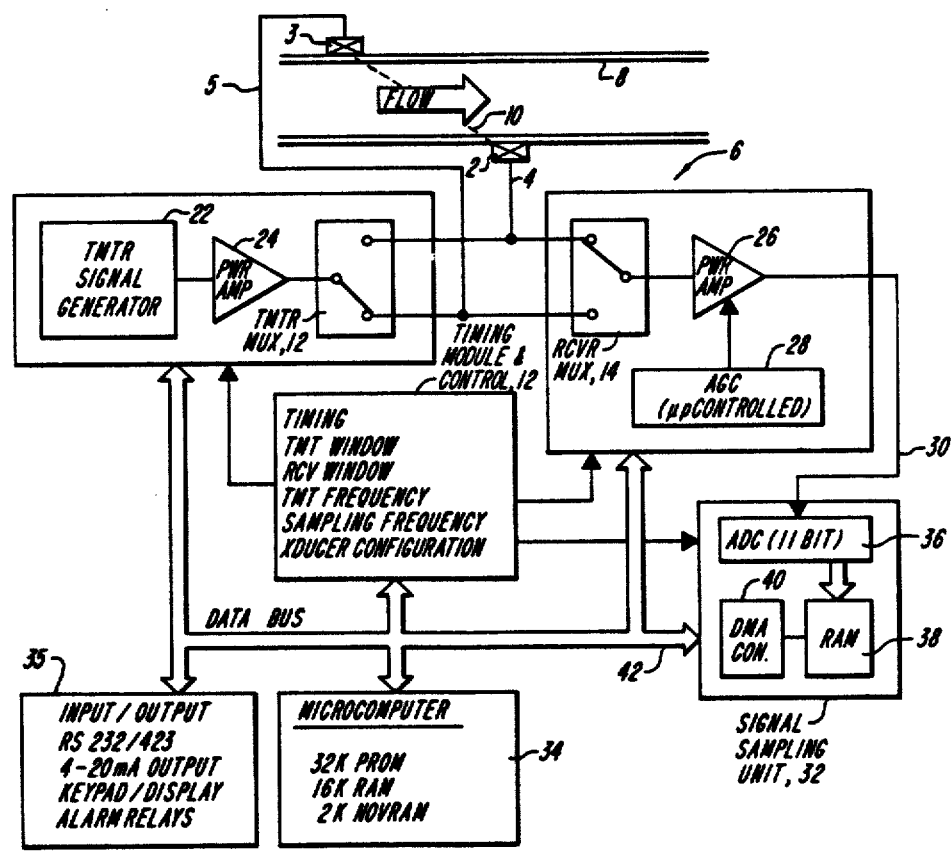
FIG. 2 is a block diagram of flow determining apparatus according to the invention for use in a system such as that of FIG. 1.

FIG. 2 is a block diagram of the hardware components of a flow determining apparatus 6 according to the present invention. The lines 4, 5 from each transducer are connected to a transmission multiplexer 12 and a receiver multiplexer 14. Multiplexer 12 is controlled by a timing module 16 to provide an ultrasonic transmission signal to one or more of the transducers 2,3 at defined instants in time. Similarly, receiver multiplexer 14 is controlled by the timing module to interconnect one or more of the transducers at defined instants of time to received signal processing circuitry 26, 28 which amplifies and conditions a received signal corresponding to the previously transmitted signal.

As shown in the Figure, the transmitted signal is provided by a transmission signal generator 22, the output of which is amplified by a power amplifier 24 and connected through the multiplexer 12 to an appropriate one or more of the transducers 2,3. Similarly, the received signal is connected through the receiver multiplexer 14 to a receiver amplifier 26 having an automatic gain control loop 28 so as to provide a conditioned output signal on line 30 representative of the received signal. The gain is controlled to be within the input range of an analog-to-digital converter, discussed below. The form and timing of the transmitted signal and the received signal are discussed in greater detail with regard to FIGS. 3, 5 and 6, below.

Briefly, the received signal from line 30 is Processed to derive timing and/or frequency shift information necessary for the determination of flow rate, or of medium temperature or other characteristic of the medium. This is accomplished by a signal sampling unit 32 and microprocessor 34. Signal sampling unit 32 includes an analog to digital converter 36 which receives the amplified gain-stabilized received signal along line 30 and provides digitized values thereof to a RAM 38. A direct memory access controller 40 responds to timing and synchronization signals provided by the timing module 16, and accesses the stored digitized values, providing them along data bus 42 to the microprocessor 34. Processor 34 processes the digitized sampled received signal and correlates it with the transmitted signal to determine basic timing or frequency information. This information is then converted in a known way to a flow rate or other measurement. In this connection a keyboard, display and I/0 section 35 allows user entry of system parameters which determine selection of the appropriate formulae and display of measurement results.

Figure 3:
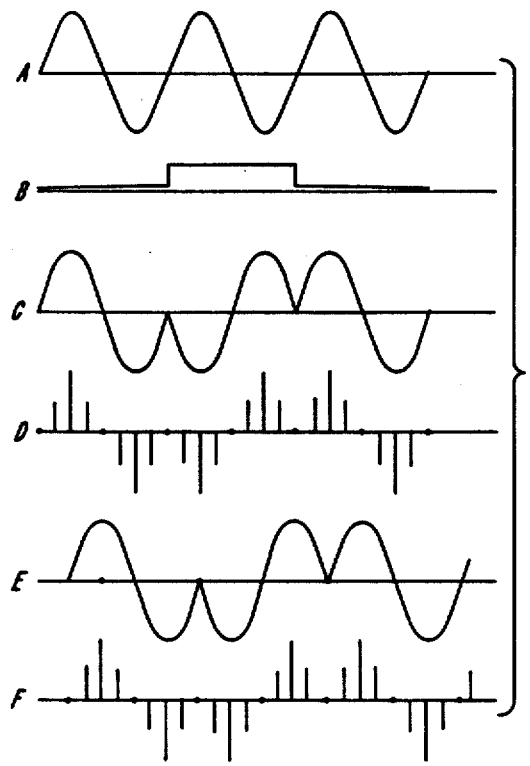
FIG. 3 shows wave forms of the apparatus of FIG. 2.

The nature of the transmitted signals and the Processing of the received signals to derive this information will be better understood with regard to FIG. 3, which shows signal wave forms for a representative processing operation. As discussed further below in relation to FIG. 4, the illustrated wave forms are used in an ultrasonic wave transit time measurement.

Line A of FIG. 3 shows a basic transmission wave form employed in a prototype embodiment of the present invention, having a one MHz sinusoidal form. In accordance with one aspect of the invention, the transmission wave form is modulated with a digital Pseudonoise (PN) code so as to produce a transmission signal with a high information content. Line B of FIG. 3 illustrates by way of example the first three bits of 0, 1, 0 of an 11-bit Barker code, a PN code of the type extensively used in radar signal processing. This code has the property that when a wave form is modulated with the code and transmitted, and the received signal is correlated with the transmitted signal, the side lobes of the correlation function are small. That is, there is a distinct peak correlation of the received with the transmitted signal which allows the recognition of the received signal with a high degree of certainty. Line C of FIG. 3 shows the one MHz sinusoidal wave form of line A after being phase modulated with the illustrated portion of the Barker code of line B. The modulation is such that the signal of line C has a sinusoidal wave form which shifts phase by 180 degrees at the start of each non-zero bit of the Barker code, line B. This signal on line C hereafter is referred to as the transmitted signal. Line D shows a digital replica of the transmitted signal which has been generated at the microprocessor 8 MHz clock frequency. Line E shows, by way of example, a representative received signal corresponding to the wave form of line C after transmission through a medium and reception by a receiving transducer.

While the passage of the signal through the conduit and medium has produced a concommitant degradation of the signal, it will be observed that the received signal, line E, has a general shape corresponding to that of the transmitted signal, line C, but offset by a certain time interval indicative of the transit time between the sending and receiving transducers. Line F shows the signal of line E sampled at the same 8 MHz sampling frequency used in deriving line D. The magnitudes of the sampled line F, correspond to the values obtained by the signal sampling circuit 32 (FIG. 2) and stored in RAM 38 for processing.

Preferably, the system 1 employs broad band transducers for its sending and receiving elements 2, 3, for example, transducers having low Q (e.g., less than approximately 2) or a bandwidth of at least two octaves. The transducer housings also are preferably free of ringing. A PVDF or other polymer transducer is suitable.

The nature of the Processing of the received signal and the derivation of flow information in the Prototype embodiment of the invention will now be described for the particular case of a pair of spaced transducers located at different stations along the direction of flow as illustrated in FIG. 1.

In this measurement protocol, the processor determines a propagation time interval between the transmission of a signal (line C) and the detection of the received signal (line E) corresponding to that signal, by correlating the two signals at successive intervals in time, and identifying the time $t_{max}$ at which the correlation function has a peak value.

In the prototype embodiment, this is accomplished as follows. The transmission signal burst (line C) is transmitted at a time t=0 and a digitized sample thereof (line D) is internally generated or is provided to the microprocessor 34. Based on keyboard-entered data and the known transducer spacing and materials, the microprocessor sets a "window" in which to look for the received signal. This window is implemented by generating a receive-enable signal which controls a gate at the input to the signal sampling unit. A window W of 128 microseconds is used, commencing at a time slightly before P/c, where P is the path length between tranducers and c is the speed of sound in the moving medium. During this window interval W the received signal is sampled at the 8 MHz sampling rate, and the resulting 1024 received signal values are stored in RAM 38 of the signal sampling unit.

The computer 34 then has available to it, for one transmitted and a corresponding received signal, a first set of 88 transmission signal values $T_i$ having values 0, ±1, ±1/·2 (corresponding to one MHz sine signal phase modulated by the 11-bit Barker code and sampled at an eight MHz clock rate), and a second set of 1024 received signal values $R_i$ (corresponding to the values detected by the receiving transducer and digitized at the eight MHz sampling frequency during the 128 microsecond sampling window). Microprocessor 34 correlates the transmitted signal with the received signal at successive times $t_i$ (i=0 . . . 1024), each separated by the system clock interval, by "sliding" the transmitted signal along the received signal and summing the corresponding product terms, to determine a set of correlation values $C_k$. It then determines a peak correlation time $t_{max}$. Specifically, the correlation function is defined at the $k^{th}$ clock Pulse as $$C_k(T,R) = \Sigma(T_i R_{i+k})$$

The time interval between the transmission and the reception of a signal is then taken to be the time $t_{max}$ at which the correlation function $C_k$ attains its maximum value $C_{max}$. Since the time between successive samples at the eight MHz frequency is 125 n, a maximum value of the correlation function at $C_k$ corresponds to a propagation time interval of 125k nanoseconds.

Because the transmitted signal is modulated with a PN code, the value of the correlation function C (T,R) will be small except when the transmitted and received signals are closely aligned. For most liquids the velocity of propagation c is much greater than the flow rate, and the variation in propagation time with flow magnitude may be small compared to jitter in the above described sampling interval. Accordingly, in a preferred embodiment, this problem is addressed by simultaneously or sequentially actuating both the upstream and the downstream transducers to transmit PN modulated ultrasonic signals. After the calculated time, the sampling window is opened and the received signal from each of the up and downstream transducers is received, amplified, digitized and stored. Separate correlation functions $C_{up}(k)$ and $C_{down}(k)$ are then defined by correlating the signal transmitted to the upstream transducer with the signal actually received by that transducer, and correlating the signal transmitted to the downstream transducer with the signal actually received by that transducer.

Each of these correlation functions C(k) is defined as described above, by offsetting the corresponding T and R signals with respect to each other by a fixed multiple k of the sampling (clock) interval, and summing the corresponding terms. $T_i R_{i+k}$ over all i. All sampling intervals and signal times are referenced to the system clock so that the 1024 values of the upstream correlation $C_{up}(k)$ and the 1024 values of the downstream correlation $C_{down}(k)$ are defined on identical time intervals. The time interval $\Delta t$ corresponding to the upstream propagation time minus the downstream Propagation time is then derived by correlating the $C_{up}(k)$ and $C_{down}(k)$ functions over time in the sampling interval to determine the time offset which corresponds to a maximum alignment of these two correlation functions. Specifically, a double correlation function $C_D(j)$ is defined, where the value for each j is $$C_D(j) = \Sigma C_{up}(k) C_{down}(j+k)$$

for j=1 . . . 1024. Since the original signal correlation values $C_k$ are defined on a single time interval, (e.g., k=0 to 1024 clock intervals following the start of transmission of the up- and down-stream transmission signals) this correlation of the upstream and downstream values does not have the uncertainty of ±1 timing interval which might otherwise result in determining the interval end points. $C_D(j)$ thus provides a relatively jitter-free measurement of the interval $\Delta t$ between the upstream and downstream propagation times. Further, the PN code modulation of the transmitted signal results in a high level of immunity to noise, with resulting accuracy of the determination of the direct propagation time measurement.

It should be noted that the first correlation described above for the direct propagation time measurement involves the arithmetical multiplication of the $T_i$ and $R_{i+k}$ signal values. This arithmetic operation is simplified in the prototype apparatus in that the values of $T_i$ are known in advance to consist of a regularly repeating sequence of values $0$, $\pm 1/\sqrt{2}$ or $\pm 1$, times a sign depending upon the Barker code and the phase of the unmodulated signal in the interval. Accordingly, all of the terms $T_i R_{i+k}$ for even-numbered i are grouped together factoring out $1/\cdot 2$, all terms for $i\sqrt{1}$ mod(4) are discarded, and all terms for $i\sqrt{3}$ mod(4) are grouped together. Thus, the summation of equation (1) is readily performed in the processor by employing two fast adders for the ($\pm 1/\sqrt{2}$) terms and the ($\pm 1$) terms.

Certain variations are possible in the implementation of the foregoing processing. For example, in correlating the $C_{up}$ and $C_{down}$ correlation functions, the propagation time difference is determined as the time when the correlation function attains a maximum. This determination may be made by comparing the correlation value of $C_D(k)$ with a stored largest value each time a summation over i is made, and keeping track of the running peak value. Alternatively, the microprocessor may simply select the first peak value which is greater than a preselected threshhold value $C_{thresh}$. The threshhold-selection approach is necessary when, for example, the phenomenon of mode conversion in a transmitting transducer results in a single electrical drive pulse forming a series of successively delayed acoustic pulses in which the first pulse, on which accurate time reference is based, may be of lesser magnitude than the mode converted phantom pulses. This threshhold value may be a variable value.

In the preferred embodiment, however, the maximum value of the correlation function $C_{max}$ is not used directly. Rather, a more precise value $C_{MAX}$ is determined by a numerical interpolator which is programmed in the microprocessor, the operation of which is illustrated in FIGS. 9A–D.

FIG. 9A illustrates the sample values $C_o \ldots C_n$ (Plotted as hollow dots) of a correlation function, which may, for example, be the one of (T-R) transit time correlation functions $C_{up}$ or $C_{down}$, or the function $C_D$ described herein. As described above, the values of $C_i$ are digital words defined at intervals of $(8 \text{ MHz})^{-1}$, or 125 ns. Briefly, the interpolator calculates the time of a precise interpolated maximum $C_{MAX}$ by interpolating the times of the C-function zero crossings immediately preceding and immediately following the peak value $C_{max}$, to yield two interpolated zero crossing times $T_{z(-)}$ and $T_{z(+)}$. The interpolated $C_{MAX}$ is then taken as occurring at the midpoint $$T_{max} = (T_{z(-)} + T_{z(+)})/2.$$

FIG. 9B illustrates the interpolation of the right hand side zero crossing $T_{z(+)}$, which is derived algorithmically using a stored $7 \times 8$ table of sinc function values $\{a_{ij}\}$. This interpolation proceeds as follows. The first negative C function value $C_k$ following the peak $C_{max}$ is located, and the points $C_{k-1}$ and $C_k$ are set equal to interpolation interval endpoints $Y_0$ and $Y_8$ respectively. An interval midpoint $Y_4$ is then calculated according to the formula $$Y_m = \Sigma\{(a_{im} C_{k-1+i}) + (a_{i(8-m)} C_{k-i})\}$$

where the coefficients $a_{ij}$ are scaled values of the sinc function (sin x)/x. These coefficients are stored as a table, illustrated in FIG. 9C. A general discussion of interpolation using the sinc function may be found in the text "The Fourier Transform and Its Applications", of Bracewell (McGraw-Hill, 1978).

Figure 9D:
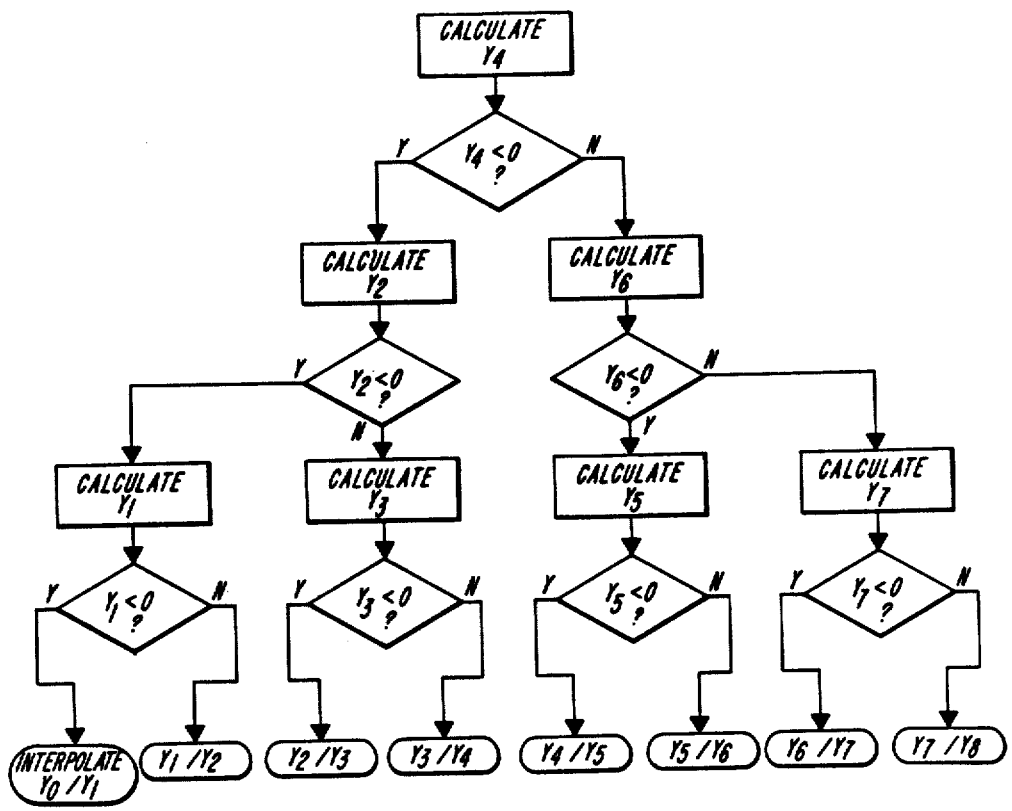

After calculation of the point $Y_4$, the sinc function interpolation is repeated to calculate two more points $Y_i$ closer to the zero crossing. This calculation is performed by reference to two additional tables of sinc function coefficient values. FIG. 9D shows the flow logic embodied in the microprocessor which determines the polarity of a sinc-interpolated point, and selects successive interpolation points $Y_i$ so as to produce two points closest to the zero crossing. For the values illustrated in FIG. 9B, the three points $Y_4$, $Y_2$ and $Y_3$ are calculated. Following the third interpolation, the zero crossing time $T_{z(+)}$ is linearly interpolated between the two closest interpolated values $Y_j$, $Y_{j+1}$ lying immediately above and below the axis. These points are $Y_3$ and $Y_4$ in the illustrated example.

As described above, the left side zero crossing $T_{z(-)}$ is then calculated using an identical Process and the interpolation correlation maximum $C_{MAX}$ is set equal to time $$T_{max} = (T_{z(+)} + T_{z(-)})/2.$$

This linear interpolation of a zero-crossing between two sinc-function interpolated points yields a zero-crossing time value, hence an interpolated maximum value $C_{MAX}$, having a resolution about two orders of magnitude finer than the system clock interval of 125 ns. Further improvement in resolution is achieved by averaging several measurements.

In this manner the time offset between two signals is determined to a high degree of accuracy. This time offset, together with a knowledge of the sound speed in the medium, permits the flow velocity or other characteristic to be calculated according to a programmed calculation. It will be understood that the fluid sound speed is independently determined based on the type of fluid and its temperature, or by performing a baseline calibration measurement on a fixed reflector located in the conduit, or by any other known method.

In accordance with another aspect of the present invention, a flow meter according to the invention includes a mode selector operative to select one of two or more operating modes based upon analysis of the processed received signals, so as to Perform a processing regimen which best extracts information from the detected signal under existing flow conditions.

Figure 4:
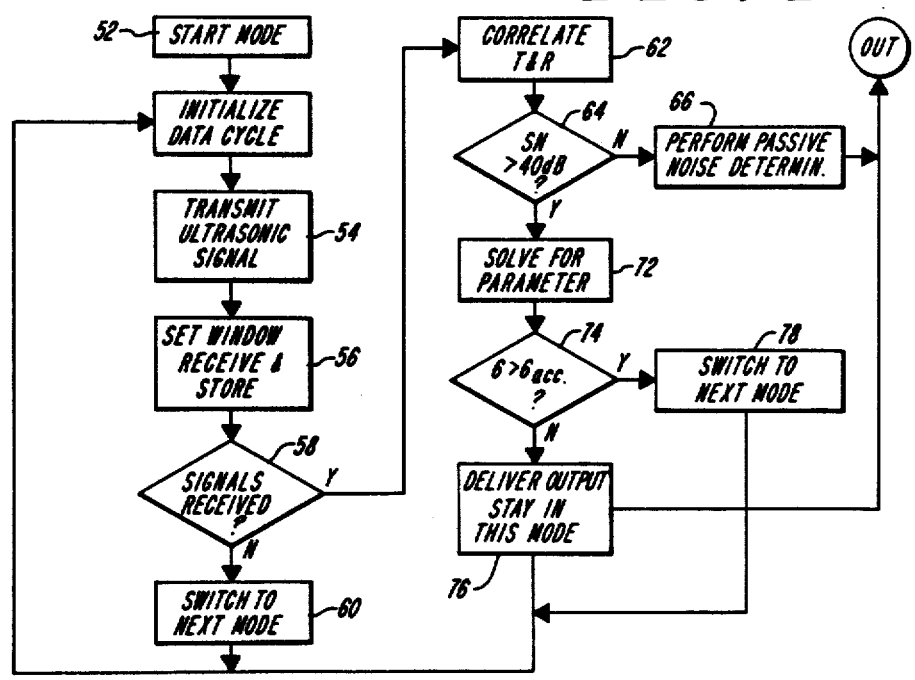
FIG. 4 shows the mode selection logic of the apparatus of FIG. 2.

The operation of a mode selector in such a Preferred embodiment is illustrated in FIG. 4, in a system including the signal generating transmission and processing elements of FIGS. 1 and 2. In accordance with this aspect of the invention, the user enters basic data through the keyboard to indicate the medium type or properties, meter factor K, Reynolds correction number, transducer type, transducer spacing, pipe inner diameter, conduit shape and other basic application data from which the processor derives or looks up the appropriate equations for converting process signal measurements to output flow data. The processor then starts operation in a first or START mode designated MODE 1 which will generally be a transit time measuring mode as described above with reference to FIGS. 1-3.

As shown in FIG. 4, the mode selector 50 starts in the start mode 52 and transmits one or more signals, e.g., upstream and downstream transmission signals T, at 54. Then, in accordance with its stored data, it sets a reception window for sampling and processing received signals 56. During the receive window a preliminary determination 58 is made whether a signal was received. If not, the mode selector 50 switches mode at 60 to effect a different Processing protocol which may be more amenable to measuring the actual flow conditions.

As an example, for highly attenuating biphase flowing material, the transmitted signal may not reach the downstream transducer. In the event at step 58 no determinable signal appears to have been received the mode is switched and an alternate signal transmitting or processing mode is employed. Otherwise, at 62 the transmitted and received signals are correlated in accordance with the selected mode, and at 64 a determination is made whether the signal to noise ratio is greater than a pre-set threshhold, e.g. 40 dB.

If the noise exceeds that level, then at 66 the mode is switched to perform flow measurements based solely upon a passive measurement of noise, without attempting to correlate transmitted and received signals. The passive noise measuring Protocol may simply employ a look-up table which stores an empirically-derived flow value for each measured noise level. This stored value is then Provided as an output along line 70.

On the other hand, if at step 64 an acceptable signal to noise ratio is detected, the processor proceeds to solve for a flow parameter (for example, the area-averaged flow velocity $V_A$) based on the quantity derived by the correlation of the T and R signals. The derived value of the parameter, e.g., $V_A$, is stored and the polling process is continued to derive a set of measurement values of the same parameter over a short (e.g., 1, 10 or 30 second) sampling interval.

Once a set of flow values has been derived, the processor computes the standard deviation $\sigma$ of the derived values of the parameter, and compares it to a threshhold acceptable level of variation. An acceptable range may be, for example, ten percent. Based upon this comparison, at 74, the mode selector 50 either selects another mode, or delivers the measured data as an output and continues performing flow measurements in the existing mode. Specifically if $\sigma$ exceeds the threshhold, indicating jittery derived data, the selector selects the next Processing mode, and a new regimen of signal analysis recommencing at step 62, or a retransmission and correlation commencing at step 54, are made to obtain a better flow measurement. Where the received signals were well defined but their information content erratic due to intervening flow conditions, the same set of stored received signals may alternatively be sorted and processed with a fast fourier transform calculation to derive frequency data which may be more strongly correlated with the transmitted signals.

Alternatively, if at step 74 $\sigma$ has been determined to be acceptable, the existing mode is deemed to produce meaningful data and the derived flow parameter measurements are simply delivered as an output along line 70, with the processor continuing to run in the existing processing mode. In this case, at 76 control returns to initialize the data transmission and reception cycle for another round of measurements.

Included in the mode selection is the optimization of the carrier signal for a given mode. Applicant has discovered that the impulse response of certain transducers results in an acoustic output which is highly distinctive and well adapted to produce a sharply correlatable received signal in certain media. For such transducers, the transducer impulse response itself acts as a code-modulator of the electrical drive signal provided to it, and accordingly the term code, as used herein, includes a code-like modulation resulting from the natural resonances and harmonics of a particular transducer. With this understanding of the meaning of "code", the carrier signal selection for a given mode includes two or more of the following four steps.

(1) Select a transducer having an appropriate impulse response including a desired center frequency, bandwidth, ringing characteristic and determined waveform. In most cases, a two- to four- octave bandwidth will be desired, having little ringing. The processor is programmed to select from among the different transducers connected to the measurement system.

(2) Frequency modulate the carrier, or in a more common case, simply select a carrier frequency, e.g., 0.05, 0.1, 0.2, 0.5, 1.0 or 2.0 MHz. For example, a 0.1 MHz frequency would be selected for gases and a 1.0 MHz frequency would be selected for liquids with a path length below about one meter.

(3) Amplitude modulate the carrier to produce a tone burst, e.g., the 11-cycle burst discussed herein. Thus, a burst of 11 $\mu s$ for a 1.0 MHz carrier, or a burst of 110 $\mu s$ for a 100 kHz carrier are produced.

(4) Phase modulate the tone burst with a code having low R-T correlation function side lobes, such as the 11-bit Barker code discussed herein.

Figure 8:
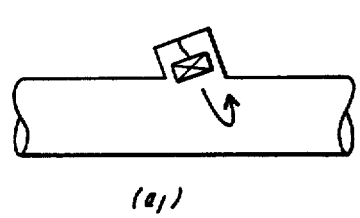
FIGS. 8(a)–(f) show different transducer geometries with a schematic illustration of signal detection and processing modes.
Figure 8:
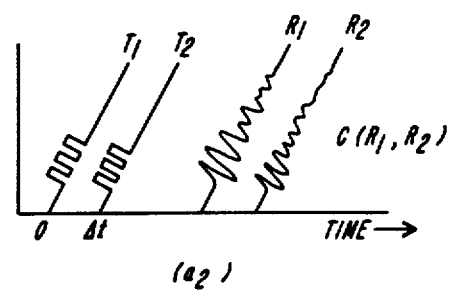
Figure 8:
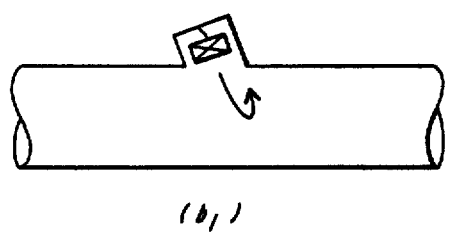
Figure 8:
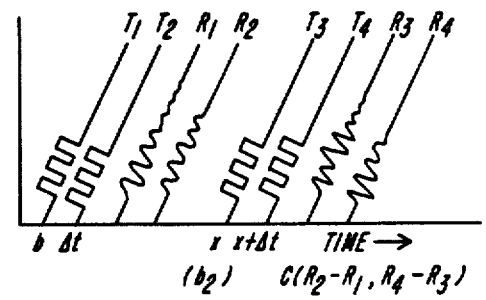
Figure 8:
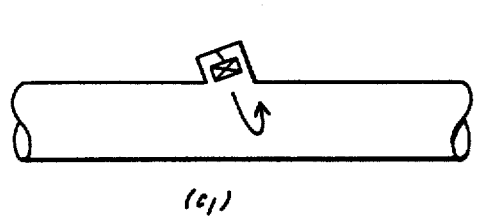
Figure 8:
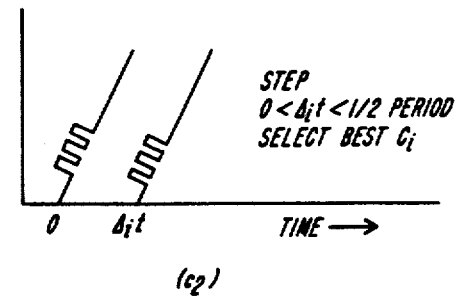
Figure 8:
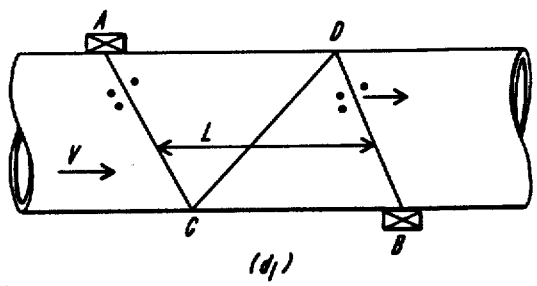
Figure 8:
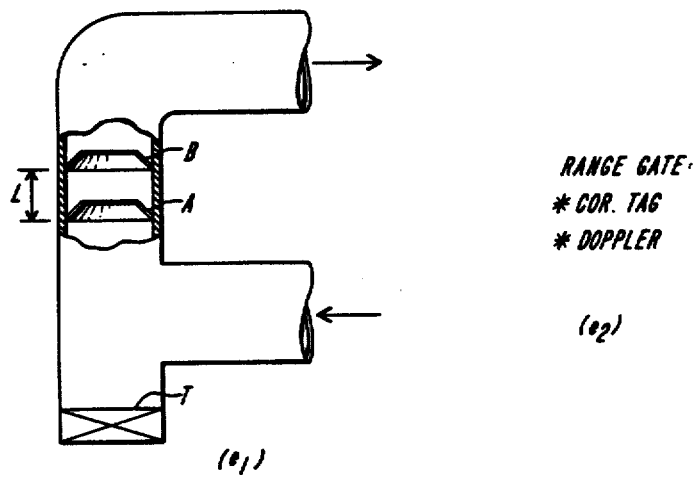
Figure 8:
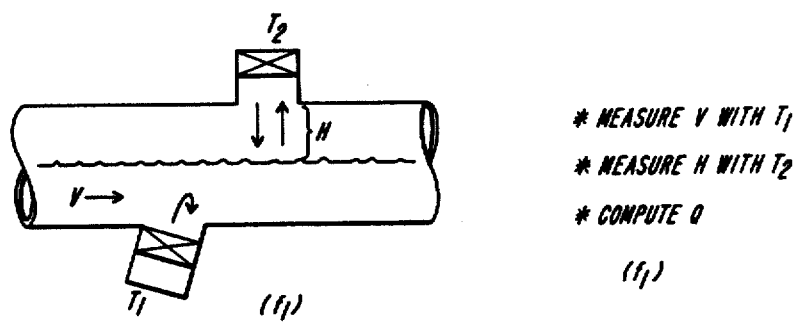

FIG. 8 illustrates different modes contemplated in further embodiments of the invention, which for clarity are shown with a tranducer diagram, followed by a schematic graph of representative transmitted signals (denoted $T_i$), corresponding received signals (denoted $R_i$) and relevant time delays $\Delta t$ for the described mode. Below the signal graph is shown the correlation operation performed in that mode. By way of detailed example, FIG. ($a_1$) of FIG. 8 shows a single transducer mounted to transmit a signal and receive a reflection thereof. FIG. ($a_2$) illustrates a signal protocol in which identical transmission signals $T_1$, $T_2$ are transmitted with an intervening delay of $\Delta t$, and corresponding received signals $R_1$, $R_2$ are detected and digitized. The notation $C(R_1, R_2)$ indicates that the two *received* signals are correlated. The time offset corresponding to the maximum of this correlation function will then differ from the time $\Delta t$ by an amount $2\Delta_x/c$ where $\Delta_x$ is the distance the fluid has travelled in that time interval, and c is the fluid sound speed. Applicant has found that the correlation value of two temporally proximate received signals is higher than the correlation value of a received with a transmitted signal when flow conditions or noise introduce signficant alterations in the transmitted signal.

Similarly, FIG. ($b_1$) shows an identical Pulse-echo transducer arrangement with a different signal protocol illustrated ($b_2$). In this latter Protocol, a first set of two identical transmission signals $T_1$, $T_2$ are sent at interval $\Delta t$, followed by a second set $T_3$, $T_4$ a short while later. The difference signals formed by the corresponding pairs of received signals are correlated, as denoted by the notation $C(R_2-R_1, R_4-R_3)$. This Processing mode largely eliminates coherent noise such as transducer and pipe ringing.

FIG. (C$_2$) shows a stepping protocol in which successively longer intervals Δt$_i$ between transmission Pairs are used to determine a correlation signal with high resolution. The correlation function may be either of the two preceding ones (b) or (a).

Illustrations (d$_1$) and (e$_1$) of FIG. 8 show further embodiments of the invention. In this aspect the invention includes systems with a multi-mode signal generating and processing apparatus, and having a small or minimal number of transducers, either for a given mode of interrogation, or for a multiplicity of modes. For example, correlation tag and correlation contrapropagation measurements are both performed in one embodiment of a system, with a single fixed pair of transducers. As shown in FIG. 8(d$_1$), in such a system the transducers are angle beam type transducers, located at locations A and B. The contrapropagation mode exercised between A and B is conventional, and requires no elaboration. However, in contrast to conventional correlation tag measurement arrangements in which two signal Paths are perpendicular to the flow axis and require four transducers, the embodiment of FIG. 8(d$_1$) performs tag processing requiring only two transducers and the identical hardware is used, in a different mode, for direct propagation time measurements. As shown in (d$_1$), tags crossing path AC cause disturbances there, and cause disturbances again in later crossing path segments CD and DB. However, path segment CD is oriented differently than the other two segments, so only the AC and DB disturbances will be well-correlated. Thus, correlation of two received signals yields a delay t=L/V. The same transducers at A or B are also used in the Doppler mode and in the passive listening mode. Thus, a single Pair of fixed transducers with the present apparatus operates in a multiplicity of measuring modes.

FIGS. 8(e$_1$) and (e$_2$) illustrate an axial path interrogation with a single transducer.

As shown, a pair of truncated corner reflectors A, B are axially spaced a distance L apart. A single transducer T transmits a signal and two received signals are range-gated to perform a tag measurement. The reflectors provide a fixed spacing allowing a baseline measurement of the sound speed c in the fluid so that the Doppler measurement of Mach number V/c can be converted to V. To the extent that c is a reproducible function of fluid density ρ, the Doppler configuration with c reflectors thus allows mass flowrate M to be determined from the Product M=KAρc (V/c) where A=duct area and K is the Profile-dependent meter factor, which is very nearly equal to unity for axial interrogation.

Another multi-mode application, shown in FIGS. 8(f$_1$) and (f$_2$), is the measurement of total flow Q in a partly-filled conduit. In this application, one mode measures liquid velocity V (or the V distribution) and another mode measures the liquid level H. The processor then computes Q from these measurements.

As described above, a flow meter according to a preferred embodiment of the present invention digitizes a received signal an performs one or more correlations between the transmitted and received signals to derive flow information, including, for example, signal transit time. In a preferred embodiment, the digitized received signal is sampled in accordance with a clock aligned with the transmitted signal, and a plurality of the received signal values are then subjected to a fast fourier transformation to determine coefficients for each of a plurality of component frequencies making up the received signal. A received signal frequency component of greatest magnitude is then compared to the frequency of the transmitted signal, to ascertain its Doppler shift, and the Doppler shift is converted to a flow output.

Figure 5:
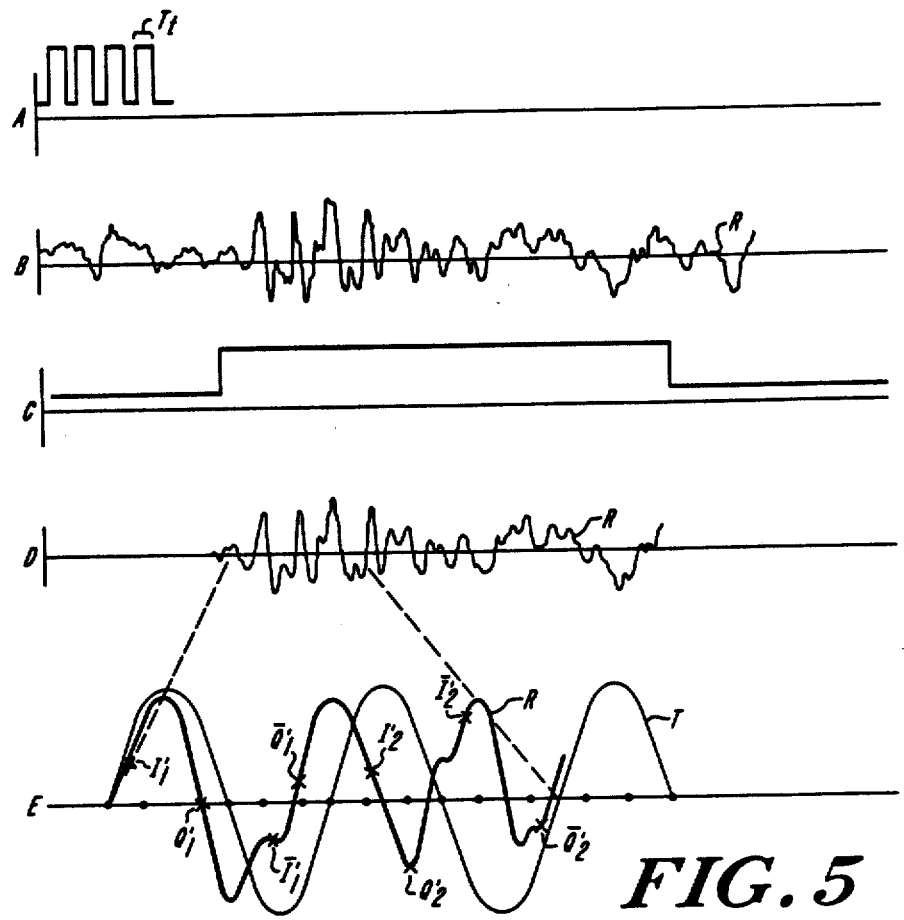
FIG. 5 illustrates frequency analysis of a received wave form.

FIG. 5 illustrates the implementation of this aspect of flow meter operation in the preferred embodiment. Line A of FIG. 5 shows the transmission signal which is provided to a transducer, and launched into a flowing medium to perform Doppler-based flow measurements. This signal is a regular square drive pulse, with a pulse width T, characteristic of the transmission clock. In a Prototype design, the transmission frequency is selected to be 500 kHz, so that for a medium which conducts sound at 5000 feet/second, a range of Doppler shifts between 20 Hz and 2.5 kHz will correspond to flow range between approximately 0.2 and 25.0 feet per second. The transmitted signal, line A, is launched into the medium and is reflected from scatterers in the medium forming a received signal, shown in line B, which may be picked up by the same or a different transducer.

In general, the received signal will include energy scattered from various positions within the flowing medium, and thus will contain information about particulate or bi-phase matter entrained at different flow velocities at different points in the medium. Accordingly, to isolate a received signal having as primary components the reflected energy from a station of interest in the flow path, the processor sets a data receive enable signal, shown in line C of FIG. 5. This enable signal defines a "window", and goes high during a desired sampling interval which starts slightly before the transit time of the transmitted signal to and from the desired station in the flow path. For example, to sample the flow at the center of a two-foot diameter conduit using a single transducer for the transmitted and reflected wave, and assuming a medium having a transmission velocity of 5000 feet per second, the processor sets the receive enable window to open at approximately 0.4 ms following initiation of the transmission signal. In order to provide samples of the received signal from which sufficient flow information is recoverable, the width of the window is set at least equal to the period of the Doppler frequency corresponding to the lowest anticipated flow rate, and the received signal is then sampled at a sampling rate at least equal to twice the Doppler shift corresponding to the highest anticipated flow rate. For the 20 Hz to 2.5 kHz range of Doppler shifts in the example described above, a sampling interval of 50 milliseconds is used, and samples are taken of the received signal at a 5.12 kHz sampling rate.

Line D of FIG. 5 shows the portion of the received signal passed by the receiving transducer to the signal processing section of the flow meter, and line E is an enlarged view of the same wave form showing the digital sampling signal extraction performed during Doppler analysis of the signal. As shown, equispaced samples I', Q', Ī', Q̄' are taken of the received signal during the enable window. The I' and Ī' signals represent the in-phase component of the received signal (aligned with, and 180 degrees out of phase with) the transmitter clock, and the Q' and Q̄' samples represent the quadrature components with respect to the transmission clock. For the four-pulse transmission signal shown in line A, the received signal is sampled four times per cycle, so that during the receive enable window a 16×4 array of I, Q signals is compiled having the form:

$r_1, \quad Q'_1, \quad r_1, \quad Q_1$ $r_2, \quad Q'_2, \quad r_2, \quad Q_2$

. . . .

. . . .

. . . .

$r_{16}, \quad Q'_{16}, \quad r_{16}, \quad Q_{16}$

The average in phase and quadrature values are then defined as $I_n = \Sigma(I_i' - \overline{I_i'})$ and $Q_n = \Sigma(Q_i' - \overline{Q_i'})$ The aforesaid transmitting and sampling process is repeated at a pulse repetition frequency of 5.12 kHz in order to determine a set of 256 I, Q samples $I_0, Q_0; I_1, Q_1; ..I_{255}, Q_{255}$].

Once the 256 in-phase and quadrature signal values representative of the received signal from a defined flow area within the conduit have been obtained, these values are fed to a fast fourier transformer to produce a transformed set of 256 values corresponding to different frequencies spread about the nominal transmission signal frequency. This frequency component histogram of the received signal is then inspected to select the frequency having a maximum component, which is taken as the center frequency of the return signal. The Doppler shift, equal to the frequency difference between this maximal component frequency and the frequency of the transmitted signal, is then converted to a flow velocity using known conversion algorithms. This conversion may be implemented with an arithmetical Processor to perform a computation using known formulae, or preferably is implemented in part by using a look-up table of stored conversion values in conjunction with one or more simpler calculations.

In a further development of the preferred embodiment, the processor of the flow meter is programmed to actuate each of a plurality of clamp-on transducers to develop range-gated Doppler return signals for each of a plurality of different depths within the flow conduit. Each transducer is used in oblique incidence to develop a range-gated Doppler signal for the portion of flow in a defined angular segment of the pipe. As the receive enable window is set to distances ranging from the center of the pipe out to the circumference, the measured Doppler values give flow velocity locally as a function of r and $\Phi$, where r is the radial distance from the pipe center, and $\Phi$ is the circumferential coordinate around the conduit. These flow values are then summed or integrated to obtain the total flow across the conduit.

Figure 6:
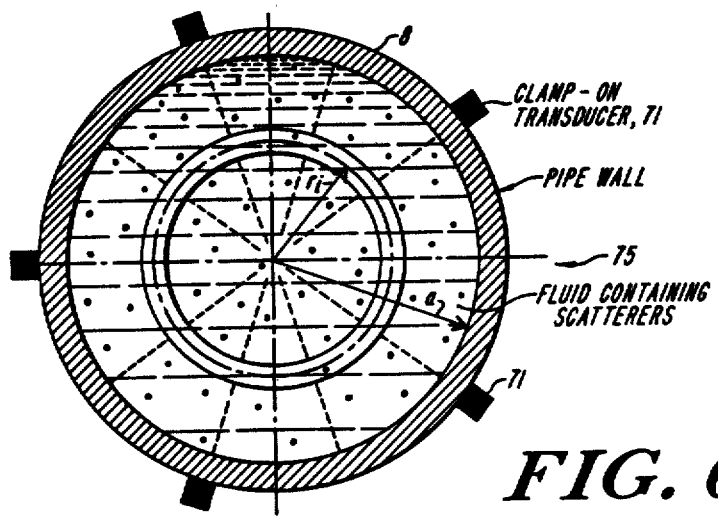
FIG. 6 illustrates a further flow determination system.

FIG. 6 illustrates one transducer arrangement 75 useful for such processing. In this arrangement, a conduit 8, shown in cross-section, has a plurality of clamp-on transducers 71 spaced thereabout at discrete angular positions. Each transducer 71 is mounted to provide oblique incidence and is actuated by the processor to transmit an interrogation signal and receive a reflected signal from bi-phase or particulate matter entrained in a flowing medium in conduit 8. For each transducer, during its $i^{th}$ interrogation cycle, the receive enable window is set so that the return signal analyzed for that transducer corresponds to energy from the transducer's transmitted signal scattered from a segment of an annulus 72 which, as illustrated, is spaced at a radius $r_i$ from the center of the conduit. Where the flow is known to be axially symmetric, i.e., not a function of angle, a single transducer may be used, although preferably plural transducers are used to simultaneously provide plural flow measurements as a function of $\phi$.

Thus, the $i^{th}$ interrogation cycle range gates the received signal to analyze flow in an $i^{th}$ selective region of the conduit. By range gating, the complete diameter of the conduit (or for highly attenuating media, the half-diameter) is split into I bins with each bin representing the signals returned from the annulus at a distance $r_i$. The processor iteratively performs the Doppler range analysis described above, successively setting the receive enable window to process signals from successively spaced intervals $r_i$ across the conduit. Eight or sixteen bins may provide a reasonable resolution. Each transducer acts as a transmitter and then a receiver of energy scattered back to itself after obliquely interacting with the axially flowing medium along a tilted diametral (or radial) path. The area $A_i$ of each annulus at radius $r_i$ is equal to $2\pi r_i \times 2a/I$, where a is the pipe radius, and the total flow of medium in each annular region is given by the area of that region times the Doppler-derived measured velocity. According to the further embodiment of the microprocessor above described, the measured velocity in each annulus $A_i$ is set equal to an average velocity $V_i$ by taking the average of the velocities measured by each of the receiving transducers in its ith bin The area $A_i$ of the annulus times this average velocity $V_i$ is calculated as the annular contribution $Q_i$ to the total flow Q. The processor then sums the flow of $Q_i$ over all I annuli to yield the total flow Q.

This embodiment of the flow meter has certain advantages over the prior art. In cases where the attenuation is too high to interrogate entirely across the pipe diameter, with a path length 2a, the processor's mode selector may select a mode wherein range bins are distributed only over the radius path r=0 to r=a. In this case a maximal number of transducers, e.g., five or more, are preferably provided, and in selecting a mode the processor selects the maximal number of transducers to be actuated and interrogated to provide a sampling profile representative of the total flow. Similarly, when there is little attenuation, each transducer is actuated to interrogate along a full diameter, yielding more sample points and greater accuracy. Actuation of a single transducer may suffice to obtain the required degree of accuracy. When the flow is considered unlikely to be axially symmetric, rather than providing from data obtained with only one tranducer an average V for each annulus, an additional mode may perform separate computations of V for each transducer, and store values of V as a function of r and circumferential coordinate $\Phi$ in a table. The processor then performs a two-dimensional summation to derive an accurate integration of total flow.

It will be understood that while FIG. 6 shows the transducers oriented normal to the conduit wall 8, the active elements thereof will in fact launch the transmitted waves and receive reflected waves obliquely, with a component along the direction of flow. Accordingly, all circumferential transducers may be actuated essentially simultaneously, each may simultaneously develop its own return signal, with negligible contribution from the other transducers. Because of the relative independence of the obliquely reflected signals, while the number of correlations performed will depend the data processing rates achievable by the microprocessor, the computational complexity itself is no greater than for a single transmit and receive pair, discussed above in connection with FIGS. 1 through 4. Moreover, the timing module and the data digitization and memory storage 32 are each fast circuits operating independently of the microprocessor, so that by processing and storing the detected signals, the invention achieves fast and essentially simultaneous measurements of different flow regions. The received signal data is then processed, and the transit time, flow profile or other data are derived in the slightly slower operation of microprocessor 34, which provides real time calculations of a speed sufficient for process control over a range of flow rates and conduit sizes.

Apparatus according to the invention as described above employs coded burst correlation detection to provide improved measurement over broad band pulses detected without correlation, or even over uncoded tone bursts detected by correlation when random noise is present. However, the coded tone burst can be masked by coherent noise such as the acoustic short circuit noise which occurs when the conduit walls provide a parallel transmission path to that of the fluid. For example, a small-diameter thick-walled steel vessel containing water, or almost any size steel pipe containing air, introduces considerable acoustic short circuit coherent noise.

Accordingly, in preferred embodiments of systems according to the invention, there are provided one or more constructions for effecting coherent isolation (CI), by which is meant the reduction or elimination from the detected signal of spurious acoustical noise which is coherent or highly correlated with respect to the transmitted signal. One such CI construction tailored to the 11-bit Barker code is a delay line mount long enough to delay the acoustic short circuit until all eleven code bits have been received.

Figure 10:
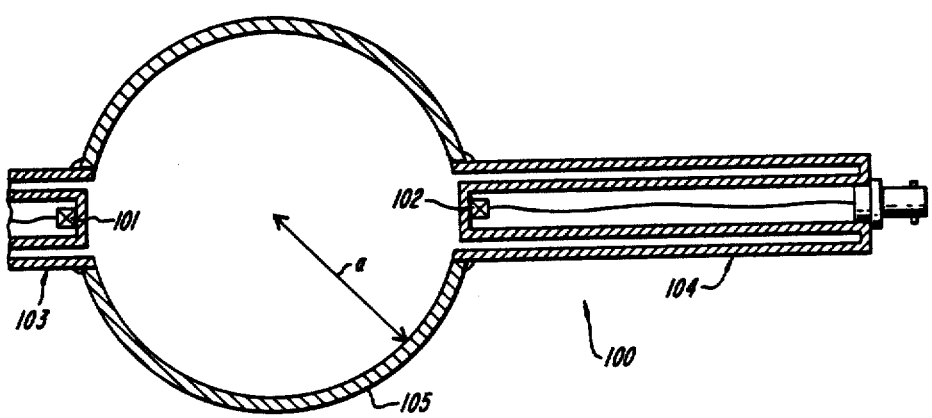
FIGS. 10A–10B show systems with coherent signal isolation.

FIG. 10A shows a cross-sectional view of the transducer and conduit configuration in such a Preferred system 100. In FIG. 10A, transducers 101, 102 are symmetrically mounted in reentrant delay mounts 103, 104 on a pipe 105 of radius a, with a total delay path $X=2x_r+x_\phi$ (radial and circumferential paths). X is selected such that $X/C_L \geq a/C_o + PW$ where $C_L$=longitudinal velocity in pipe wall or delay material and $C_o$=longitudinal velocity in fluid, and PW=pulse width of the 11-bit code. For a 2-inch pipe, a=1 inch or 25.4 mm, from which the radial extent $x_r$ of the delay mount should be no less than the values tabulated in Table 1, below. These values assume a 100 kHz coded burst for air and a 1 MHz coded burst for water.

TABLE 1

| | | | | | |
|---|---|---|---|---|---|
| $x_r$ term (orthogonal reentrant delay mount for 11-bit Barker code and 2-inch steel pipe) | | | | | |
| Fluid | f, Hz | PW, μs | $C_L/C_o$ | $x_r$, inches | mm |
| Air | $10^5$ | 110 | 20 | 24 | 600 |
| Water | $10^6$ | 11 | 5 | 5 | 127 |

This delay mount completely eliminates the acoustic short circuit component of a given transmission from interfering with reception of the desired fluid-transmitted component.

Figure 10B:
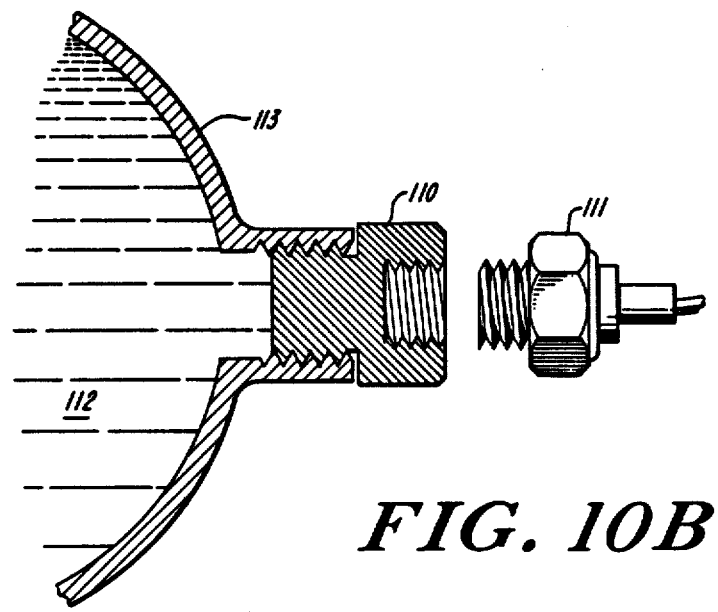

Another system for providing isolation from coherent noise includes a transducer mounting formed of a selected low impedance material. A related improvement has been previously described by Lynnworth in the aforementioned 1981/1982 two-part article (at page 5, FIG. 10 thereof). That plug, however, was metallic, and provided no improvement in transmission into the fluid, nor did it provide significant isolation from the pipe wall. By replacing the conventional high impedance material of the Pipe Plug (brass or stainless steel) with a low density material like teflon, PVC or other plastic, or possibly Ti, one increases the coefficient of energy transmission into the fluid by a factor of about 2 to 10, while decreasing the transmission into the pipe wall. The plug has an acoustic or characteristic impedance which is selected to be low compared to the transducer and to the pipe, but intermediate between the transducer and the fluid. Preferably, this "directional" transmission efficiency is further accentuated by providing a multilayer plug, e.g. with successive radial layers, to improve the impedance match in the forward direction while increasing the mismatch radially. For simplicity, FIG. 10B illustrates a homogeneous plug 110 into which the transducer 111 screws. Mount 110 thus couples the tranducer to fluid 112 but at least partly isolates it from pipe 113.

The foregoing constructions provide a system in which the basic signal-providing and processing section overcomes measurement inaccuracies due to flow-induced non-coherent signal degradation, while a CI mounting structure eliminates coherent (i.e., plumbing-induced) signal masking. It will be understood that coherent isolation may advantageously be achieved by other approaches compatible with the operation of the basic invention. For example, a system may include a means of providing tags in the flowing fluid (by a passive strut, a bubble injector, or a focused transducer to provide localized cavitation), and sets of received signals ma be Processed by quadrature detection to eliminate noise which is coherent with the transmitted signal other than the energy which has traversed the defined fluid path. Quadrature processing is described, for example, in an article of Jacobson et al., May, 1985 published in *Ultrasonics*.

It will be appreciated that the provision of a flow conduit or flow cell with predefined transducer types and spacings, together with a processor having the ability to vary the selection of transducers and change the transmission and Processing modes has particular value for the remote determination of the characteristics of a medium. One particular embodiment of the invention is a borehole measurement apparatus, in which the instrument is set up for performing plural measurements in different modes to determine characteristics such as temperature, turbidity, flow, average molecular weight and the like, and to transmit the measurments to the surface.

Figure 7:
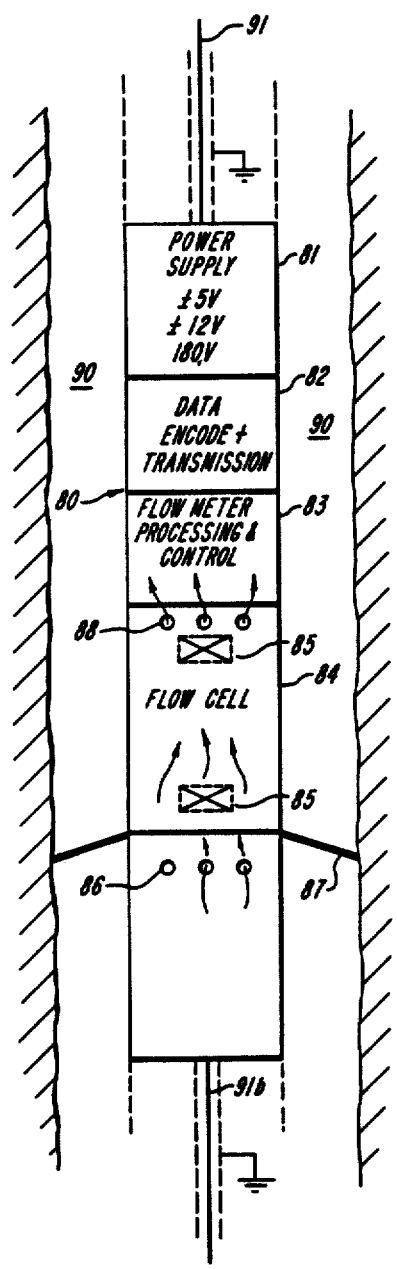
FIG. 7 shows a bore hole embodiment of a system according to the invention.

Such a device 80 is shown in FIG. 7. Device 80 is adapted for connection to a downhole tool or instrument (shown in phantom) extending above or below the device for collecting fluid for analysis, and performing other measurements which are of a conventional type. The downhole device 80 is illustrated in a borehole 90, and includes a power supply 81, data encoding and communications module 82, and a flow meter electronics section 83. The flow meter electronics section provides transmission signals to, and receives acoustic detection signals from, one or more transducers 85 arranged in a flowcell segment 84. Fluids from the strata beneath the flow cell are diverted, in the illustrated embodiment, by a basket or flow diverter 87 to force flow through inlets 86 into flow cell 84 and out outlets 88. The fluid may be isolated, flushed, diluted, screened or otherwise conditioned prior to performing measurements, as required.

The data developed by the flow meter electronics section, which preferably includes transit-time or other signal transmission information directly representative of parameters such as temperature, molecular weight and the like, are encoded and transmitted along conductive line 91, which is a single conductor grounded shield line used for providing both communications with and power from the surface.

A continuing conductor 91b extends to the lower portion of the tool string.

In addition to an automated propagation signal analysis device capable of performing analyses in adverse and inaccessible environments, with its unique signal analysis and mode switching features, the present invention contemplates systems employing novel transducer mountings and constructions. For example, for the measurement of high temperature media a buffer is conventionally mounted between the transducer and the flowing medium to insulate the transducer. With the signal processing of the present device, it is possible to use transducers having relatively low signal output but a high Curie point or transition temperature, such as quartz transducers, which may then be located more closely to a high temperature medium.

A system according to the invention may also use a less hardy transducer coupled by a buffer formed of a plurality of fibers which are arranged to relay a possibly attenuated, but non-dispersed signal while maintaining thermal insulation. Such a buffer mounting is made possible by the spectral analysis of received signals, which can accommodate a range of signal degradation without loss of information. Similarly, the invention contemplates use of extremely broadband transducers formed of a polymer such as PVDF (e.g., KYNAR), or of the copolymers marketed by the Pennwalt Corporation. For the described processing modes involving measurement of characteristics at a defined site within a conduit, the invention further contemplates forming molded focusing transducers each having a shape to preferentially transmit acoustic energy to, and receive reflected energy from, one desired site. BY employing a plurality of such transducers the timing necessary to Poll different areas of a conduit for cross sectional flow integration is simplified, and simultaneous polling of different sections may be accomplished. Focused transducers may also be pulsed to induce heating or cavitation upstream from the sensing transducer thereby creating "tags" so the device can operate in a correlation tag mode to measure flow.

The invention being thus described, modifications and variations will occur to those skilled in the art, and all such variations are intended to be within the scope of the invention as defined by the following claims.

What is claimed is:

1. Apparatus for measuring a selected transmission characteristic of a medium, such apparatus comprising
   signal transmission means for providing a coded ultrasonic transmission signal for injection into a medium at a determined time,
   timing means for determining at least one sample selection time window synchronized to said determined time,
   signal reception means for receiving signal energy from the medium and for providing during a said sample selection time window a plurality of digitized signals representative of received signal energy,
   processing means for processing said plurality of digitized signals to produce a correlation function having discrete values,
   means operative on said correlation function for determining a signal offset having a defined functional relation to the selected characteristic thereby enabling its calculation, and
   output calculation means for determining a value of the selected transmission characteristic as said function of the signal offset.

2. Apparatus according to claim 1, wherein said means for determining a signal offset includes means for interpolating a time offset of maximum correlation.

3. Apparatus according to claim 1, further comprising mode selection means for varying in response to said digitized signals at least one of
   (i) the transmission signal, and
   (ii) the processing of the processing means.

4. Apparatus according to claim 3, wherein said timing means includes means for determining a signal reception timing window in response to transmission signal path data, said apparatus further comprising
   Processing means for providing said transmission signal path data to the timing means, and
   keyboard means, in communication with said Processing means, for entry of system data determinative of said signal transmission path data, said processing means being programmed for developing said signal transmission path data from keyboard entered system data including at least two of
   (i) transducer type;
   (ii) conduit dimension or shape;
   (iii) physical characteristics of medium;
   (iv) transducer spacing; and
   (v) mounting geometry.

5. Apparatus according to claim 3, further comprising means for determining variation in successive determinations of said signal offset, and for actuating said mode selection means in response thereto.

6. Apparatus according to claim 3, further comprising a fixed plurality of transducers mounted in a structure for transmitting a transmission signal into, and receiving signal energy from, a medium, and wherein the mode selection means varies at least one of said transmission signal and said processing so as to effect different modes of measurement with the same transducers.

7. Apparatus according to claim 6, comprising a minimal number of transducers for effecting measurements of said different modes.

8. Apparatus according to claim 7, wherein a mode is a correlation tag mode and the apparatus includes a single transducer.

9. Apparatus according to claim 1, wherein the signal transmission means provides a plurality of tone bursts, and wherein the means for processing includes means for correlating two sets of signal values, each set of signal values being derived from a set of digitized signals representative of energy received by a transducer during a said sample selection time window.

10. Apparatus according to claim 1, wherein the signal reception means further includes signal selection means for selectively providing during said sample selection time window, samples of received energy values at instants in time having a defined phase relation to said ultrasonic transmission signal, and wherein the processing means includes frequency domain transform means for transforming the digitized signals representative of signal energy into a frequency domain representation of said signal energy.

11. Apparatus according to claim 1, wherein the timing means comprises means for defining different sample reception time windows each corresponding to a different region of said conduit, said signal reception means and said Processing means being operative to receive and process signal energy during each said time window such that the characteristic determined from received signals during each said window is representative of the characteristic Prevailing in a corresponding said region of the conduit.

12. Apparatus according to claim 11, further comprising means for integrating the characteristic determined from received signals during each said time window over all regions of the conduit to provide a global measurement of the characteristic of the medium.

13. Apparatus according to claim 1, further comprising a transmitting and sensing transducer mounted in a conduit so as to form a system for measuring the selected transmission characteristic of a medium in the conduit, and coherent isolation means for providing isolation between said transmitting and said sensing transducer.

14. Apparatus according to claim 13, wherein the coherent isolation means includes at least one of a delay line transducer mounting and an impedance-type transducer isolation mounting.

15. Apparatus according to claim 13, wherein the coherent isolation means comprises means for introducing noise into the signal path through the medium, and means operative on at least two sets of digitized received signals for increasing the information derived from a received energy signal component which has been propagated through the medium.

16. Apparatus according to claim 1, further comprising a broadband transducer having a bandwidth in excess of approximately two octaves.

17. Apparatus according to claim 16, wherein the transducer is formed of a polymer.

18. Apparatus according to claim 16, wherein the transducer is substantially non ringing.

* * * * *

UNITED STATES PATENT AND TRADEMARK OFFICE
CERTIFICATE OF CORRECTION

PATENT NO. : 4,787,252

DATED : November 29, 1988

INVENTOR(S) : Jacobson et al.

It is certified that error appears in the above-identified patent and that said Letters Patent is hereby corrected as shown below:

At Column 5, line 15 after "sampled" insert -- signal,--.

At Column 5, line 58 delete "± 1/.2" insert --± $1/\sqrt{2}$--.

At Column 7, line 13 delete "1/.2" insert --$1/\sqrt{2}$--.

At Column 7, line 13 delete "i√1 mod(4)" insert --$i \equiv 1 \mod (4)$--.

At Column 7, line 14 delete "i√3 mod(4)" insert --$i \equiv 3 \mod (4)$--.

At Column 9, line 42 delete "deviation o of" insert --deviation $\sigma$ of--.

At Column 13, line 19 after "samples" insert --[--.

At Column 14, line 30 delete "ith bin" insert --$i^{th}$ bin--.

UNITED STATES PATENT AND TRADEMARK OFFICE
CERTIFICATE OF CORRECTION

PATENT NO. : 4,787,252

DATED : November 29, 1988

INVENTOR(S) : Jacobson et al

Page 2 of 2

It is certified that error appears in the above-identified patent and that said Letters Patent is hereby corrected as shown below:

At Column 17, line 45 delete "BY" insert --By--.

Signed and Sealed this

Seventh Day of January, 1992

Attest:

HARRY F. MANBECK, JR.

*Attesting Officer*   *Commissioner of Patents and Trademarks*